United States Patent
Jinn-Fu

[11] Patent Number: 5,906,122
[45] Date of Patent: May 25, 1999

[54] SEMI CIRCULAR DISC STEERING WHEEL LOCK

[76] Inventor: Wu Jinn-Fu, No. 127, Hai Huan Street, Tainan, Taiwan

[21] Appl. No.: 09/127,969

[22] Filed: Aug. 3, 1998

[30] Foreign Application Priority Data

Oct. 3, 1997 [TW] Taiwan .................................. 86216763

[51] Int. Cl.⁶ .................................................. B06R 25/02
[52] U.S. Cl. .............................................. 70/209; 70/226
[58] Field of Search ............................ 70/207, 209, 211, 70/212, 225, 226, 237, 238

[56] References Cited

U.S. PATENT DOCUMENTS

| | | | |
|---|---|---|---|
| 4,829,797 | 5/1989 | Wu .......................................... | 70/209 |
| 5,239,849 | 8/1993 | Gallardo .................................. | 70/209 |
| 5,381,679 | 1/1995 | Cummins .................................. | 70/209 |
| 5,454,240 | 10/1995 | Whitney ................................ | 70/226 X |
| 5,537,847 | 7/1996 | Dalton et al. ........................ | 70/226 X |
| 5,555,753 | 9/1996 | Matlock .................................. | 70/209 |
| 5,666,832 | 9/1997 | Cunningham ............................ | 70/209 |
| 5,676,001 | 10/1997 | Ho .......................................... | 70/209 |
| 5,678,433 | 10/1997 | Riccitelli ................................ | 70/209 |
| 5,782,116 | 7/1998 | Ryan et al. .............................. | 70/209 |
| 5,842,360 | 12/1998 | Somerfield .............................. | 70/209 |

*Primary Examiner*—Lloyd A. Gall
*Attorney, Agent, or Firm*—Rosenberg, Klein & Bilker

[57] ABSTRACT

A semi circular disc steering wheel lock is mainly composed of a semi disc and a lock plate, the semi disc is in a fan shape contour having a bending portion from its edge to form an end wall and a hole at the center portion of the end wall, the inner bottom portion has a guide rail for the lock plate to slide therein and a lock core at the opposite side. The lock plate includes an L-shaped bar erecting from the lock plate and a blind hole at the opposite side of the bar. Whereas, when the semi circular disc lock is placed on a steering wheel, pull the lock plate along the guide rail until the erecting bar extending into the hole, thus, the steering wheel is confined by the lock plate to spin.

2 Claims, 5 Drawing Sheets

SEMI CIRCULAR DISC STEERING WHEEL LOCK

FIELD OF THE INVENTION

This invention relates to a semi circular disc steering wheel lock and more particularly, to a lock which is able to secure the steering wheel to protect the air bag inside of the steering wheel from being stolen.

BACKGROUND OF THE INVENTION

A various of steering wheel locks are seen in the market for protection of automobiles, one of which is a lock utilizing two bars 4 and 6, as shown in FIG. 4, to extend beyond the steering wheel so as to prevent steering the wheel illegally. This lock utilizes grooves 41 on one bar for locking purpose. Whereas when the grooves 41 are inserted into a lock mechanism 5 on one end of the other bar 6, the grooves 41 will mesh with the lock thus confining contraction of the lock bar. This improves the autotheft, however, it can not protect an air bag stored in the steering wheel from being stolen.

Another lock, as shown in FIG. 5, was therefore invented which includes a semi-circular cover 7 having a pair of holes 71 for a pair of hooks extending from a solid bar 91 and a telescope bar 92 to extend therefrom, however, the conventional art still possesses shortcomings, first of all, the edge of the cover 7 did not cover any portion of the steering wheel 8, since different vehicle model has different size of steering wheel, a gap exists between the cover 7 and the steering wheel 8, the conventional art is more complicated and requires more parts to assemble.

SUMMARY OF THE INVENTION

It is the primary object of the present invention to provide a semi circular disc steering wheel lock composed of a semi disc and a lock plate, the semi disc is in a fan shape contour having a bending portion from its edge to form an end wall and a hole at the center portion of the end wall, the inner bottom portion has a guide rail for the lock plate to slide therein and a lock core at the opposite side. The lock plate includes an L-shaped bar erecting from the lock plate and a blind hole at the opposite side of the bar. Whereas, when the semi circular disc lock is placed on a steering wheel, pull the lock plate along the guide rail until the erecting bar extends into the hole, thus, the steering wheel is confined by the lock plate to spin.

It is another object of the present invention to provide the semi circular disc steering wheel lock which is more secure and simple in structure.

DETAILED DESCRIPTION OF THE PREFERRED EMBODIMENT

Figure 1:
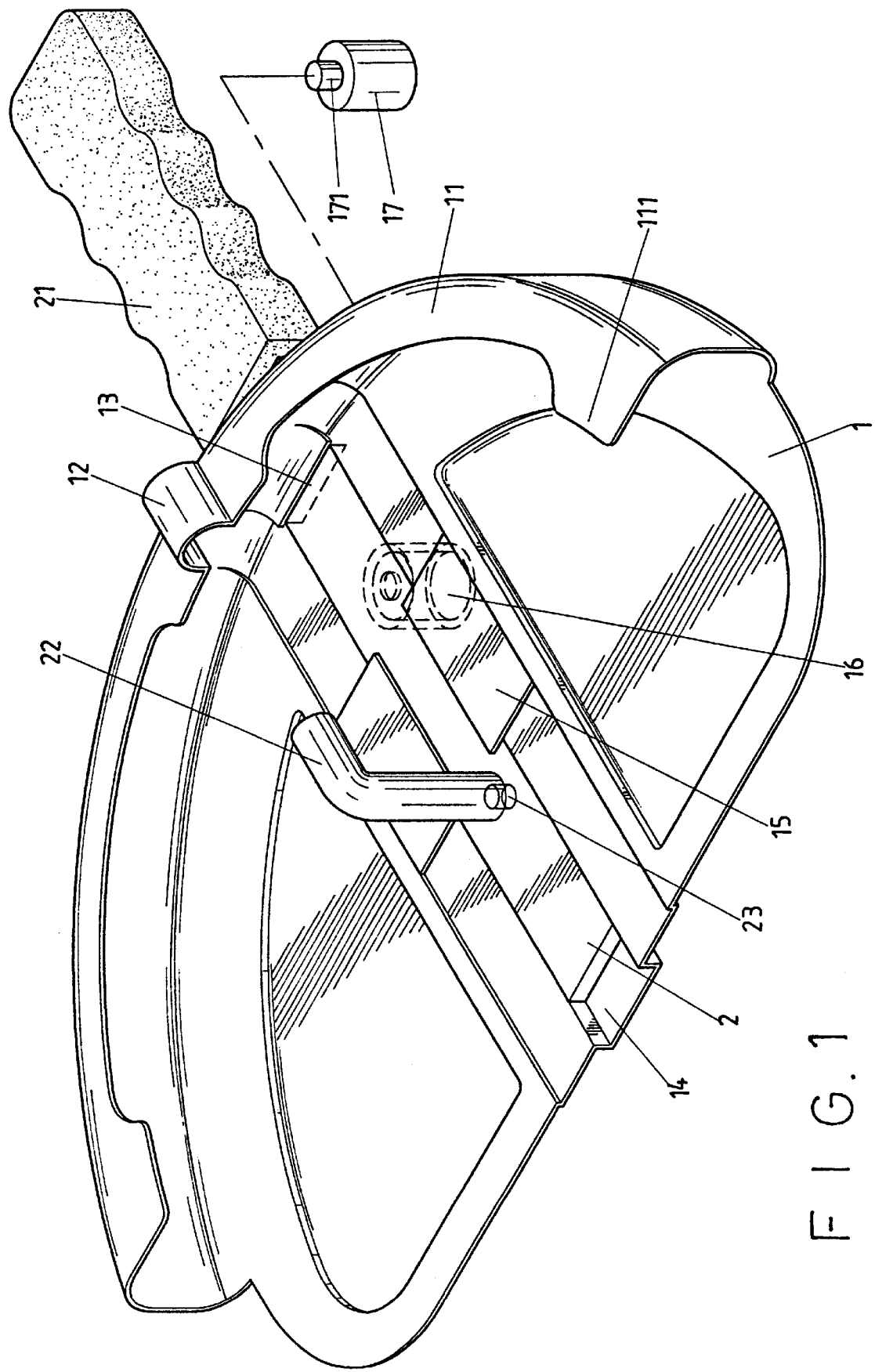
FIG. 1 is a perspective view of a steering wheel lock of the present invention.

The semi circular disc steering wheel lock of the present invention is shown as in FIG. 1 which comprises a semi disc 1 and a lock plate 2.

The semi disc 1 is shaped like a fan having a bend portion at the edge to form an end wall 11, a pair of engaging ends 111 protruding from respective ends of the end wall 11, a hole 12 at the center portion of the end wall 11, a through going hole 13 at the bottom center portion corresponding to the hole 12, a guide rail 14 at the bottom center portion of the semi disc 1, two stop strips 15 on the guide rail 14 to limit movement of the locking plate 2 and a lock seat 16 at the outer bottom side along the trail of the guide rail 14 to receive a lock core 17 therein.

The locking plate 2 has a handle 21 at one end, an L-shaped bar 22 erecting upwardly from one side with the top extending portion corresponding to the hole 12 of the semi disc 1 and a blind hole 23 on the other side of the plate 2 opposite the L-shaped bar 22.

Figure 2:
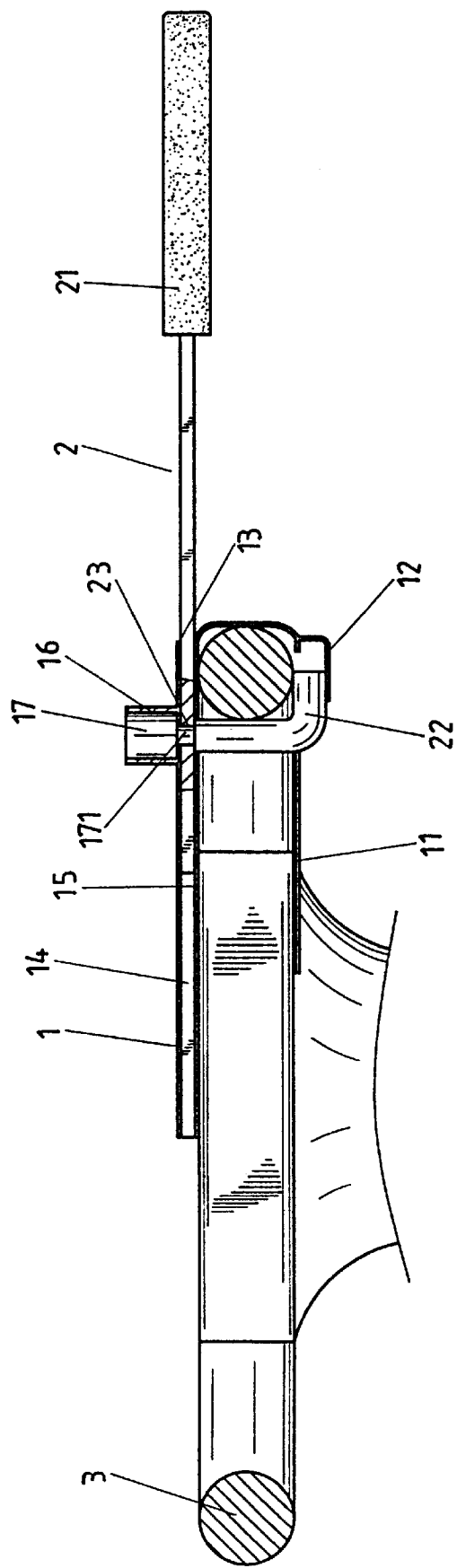
FIG. 2 is a side cross-sectional view of the present invention.

Upon assembled, as shown in FIG. 2, the locking plate 2 seats on the guide rail 14 while the handle 21 extends outward from the semi disc 1, thus enabling the locking plate 2 to slide along the rail 14, whereas the stop strips 15 conffines the locking plate 2 in a predetermined area.

Figure 3:
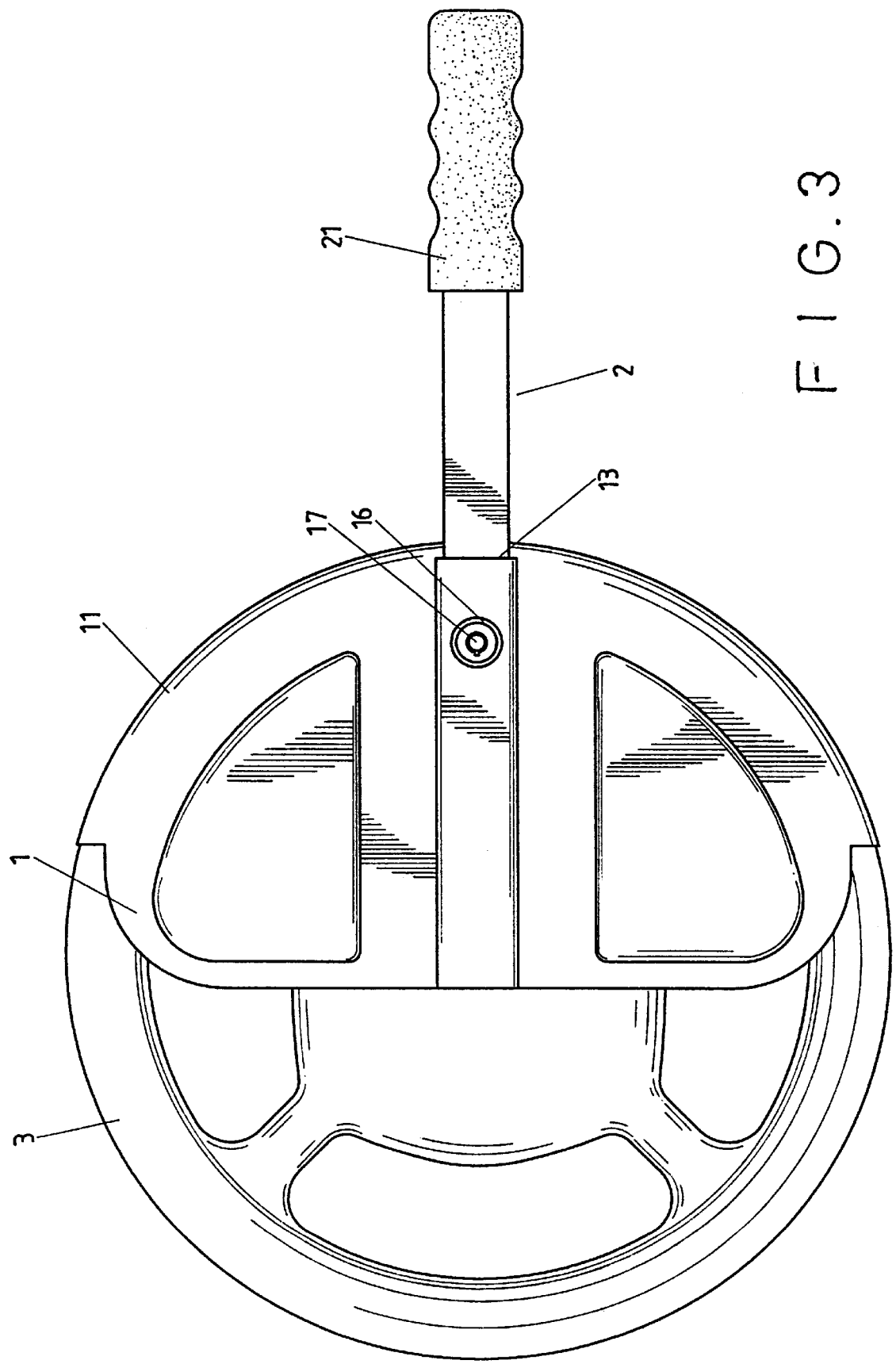
FIG. 3 is a top view showing the present invention being secured on the steering wheel.
Figure 4:
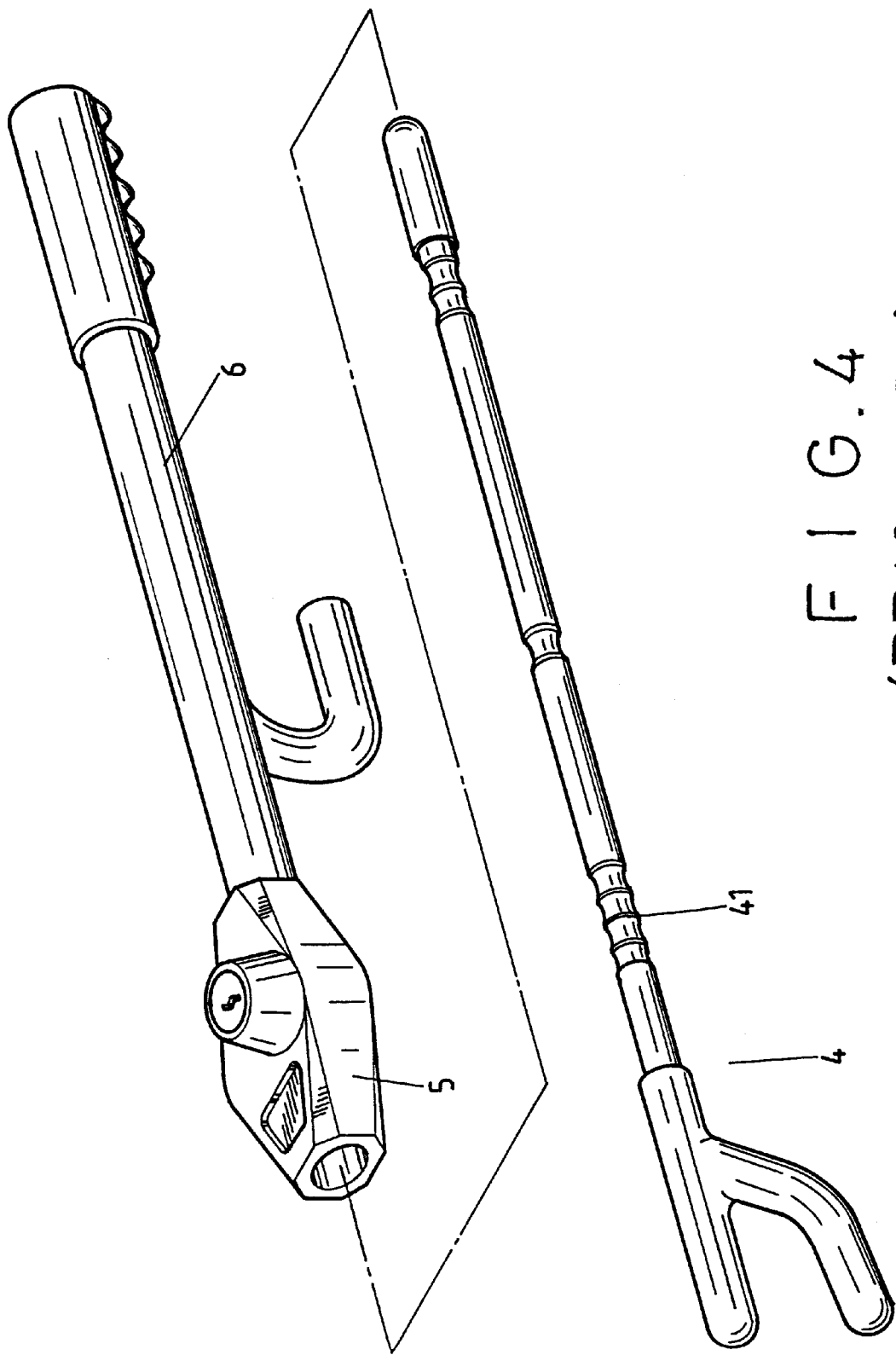
FIGS. 4 and 5 are conventional arts.
Figure 5:
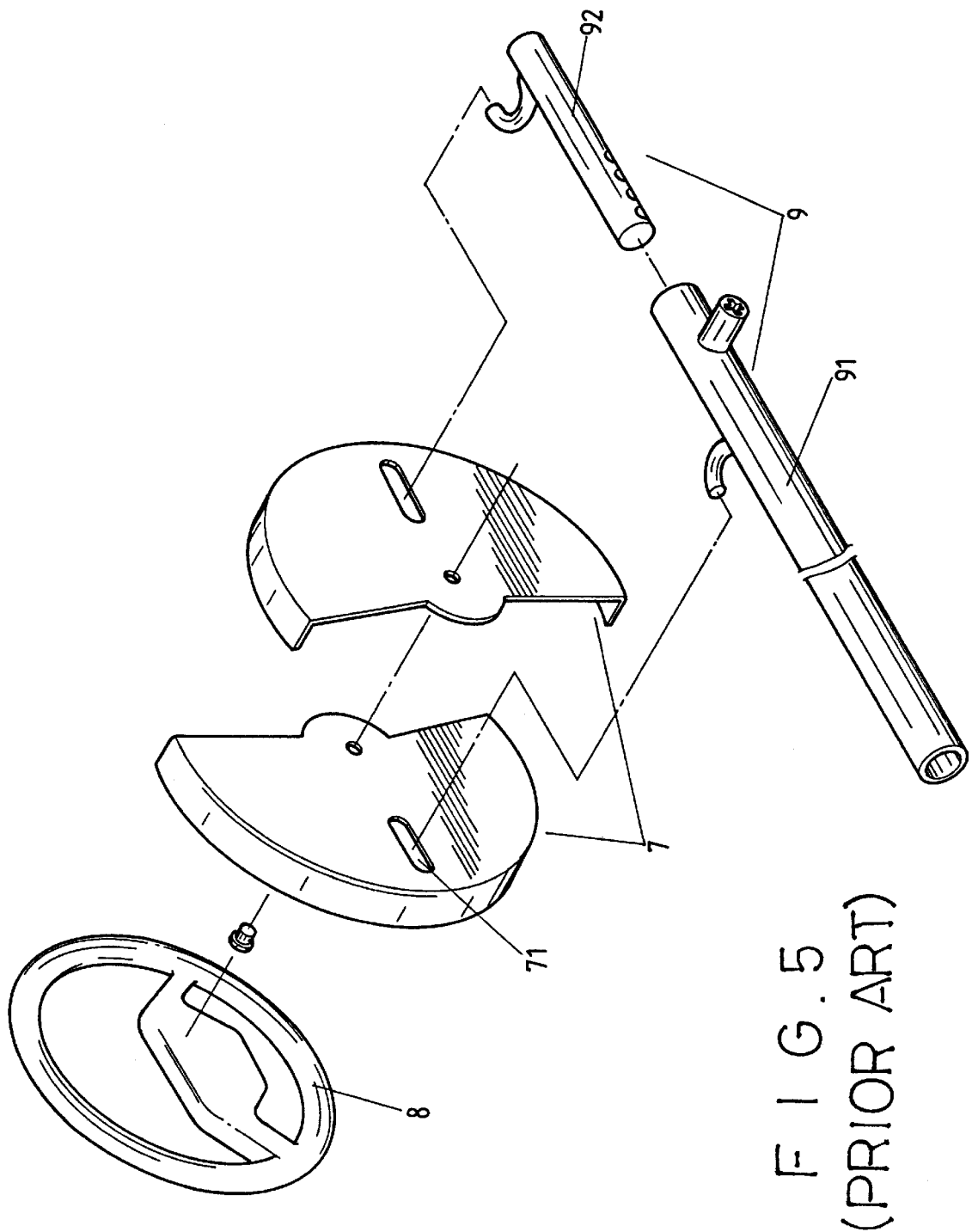

To operate the present invention, as shown in FIG. 3, place the semi disc 1 on top of the steering wheel 3 with the end wall 11 firmly against the rim of the steering wheel 3 which encompass the air bag in the steering wheel 3 and the engaging ends 111 hold the steering wheel tightly. Slide the locking plate 2 inwardly until the L-shaped bar 22 has reached the hole 12, then lock the plate 2 by extending a latch 171 of the lock core 17 into the blind hole 23 thus, the steering wheel is securely protected.

To disengage the present invention, unlock the latch 171 from the blind hole 23 which enables the locking plate 2 to be free to slide along the guide rail 14 again, thus the semi disc 1 is able to be removed from the steering wheel 3.

I claim:

1. A semi circular disc steering wheel lock comprising a semi circular disc and a locking plate and the improvements comprise:

said semi circular disc being bent at its edge upward to form an end wall with a hole at a center portion and a through going hole at a bottom portion corresponding to said hole, a guide rail at an inner bottom portion thereof, a pair of strips extending inwardly towards said guide rail, a lock seat at an outer portion along the trail of said guide rail;

said locking plate comprising a handle and an L-shaped bar erected from one side with a top portion corresponding to said hole of said semi circular disc, a blind hole being formed on the other side of said locking plate opposite said L-shaped bar; and wherein by sliding said handle of said locking plate, said top portion of said L-shaped bar will be inserted into said hole of said semi circular disc thus confining movement of the steering wheel and an air bag within the steering wheel as well.

2. The semi circular disc steering wheel lock, as recited in claim 1, wherein said end wall comprises a pair of engaging ends which encompass the steering wheel tightly when in use.

* * * * *